United States Patent [19]

Robson

[11] 4,226,028

[45] Oct. 7, 1980

[54] NDB INSTRUMENT FLIGHT TRAINER

[76] Inventor: David P. Robson, 4602 Schenley Rd., Baltimore, Md. 21210

[21] Appl. No.: 923,201

[22] Filed: Jul. 10, 1978

[51] Int. Cl.³ .............................................. G09B 9/08
[52] U.S. Cl. .................................... 35/10.26; 35/12 F
[58] Field of Search .................... 35/10.2, 12 R, 12 B, 35/12 F, 12 N, 12 S, 12 L

[56] References Cited

U.S. PATENT DOCUMENTS

| | | | |
|---|---|---|---|
| 2,404,386 | 7/1946 | Levine et al. | 35/10.2 |
| 2,418,834 | 4/1947 | Hartman | 35/39 |
| 2,431,827 | 12/1947 | Rado | 40/621 |
| 2,811,356 | 10/1957 | Reed | 272/8 R |
| 3,364,297 | 1/1968 | Osborne, Jr. | 35/12 F X |
| 3,522,728 | 8/1970 | Brun | 35/10.2 X |
| 3,546,351 | 12/1970 | Bryan | 35/10.2 |
| 3,546,352 | 12/1970 | Bryan | 35/10.2 |
| 3,548,063 | 12/1970 | Bryan | 35/10.2 |
| 3,624,262 | 11/1971 | Greenwade | 35/10.2 |
| 3,628,256 | 12/1971 | Story | 35/10.2 |
| 3,885,325 | 5/1975 | Sidoti | 35/10.2 X |
| 3,906,643 | 9/1975 | McClung | 35/10.2 |
| 4,095,351 | 6/1978 | Eisele | 35/10.2 |

*Primary Examiner*—Edward J. Wise

[57] ABSTRACT

An aviation training aid to facilitate the learning of instrument flying techniques. The device simulates problems encountered in flight when navigating by reference to a nondirectional beacon (NDB) and flying an NDB instrument landing approach. The device includes a model airplane with two functional instruments: an automatic direction finder relative bearing indicator and a compass. The model airplane is manually moved on a special table which has an inclined top and a permanent magnet concealed beneath the top. The relative bearing indicator is activated by magnetic attraction for the concealed magnet. The compass is activated non-magnetically by a weight attached to the edge of the compass card, in conjunction with the tilted attitude of the model which is caused by the inclination of the table top.

4 Claims, 6 Drawing Figures

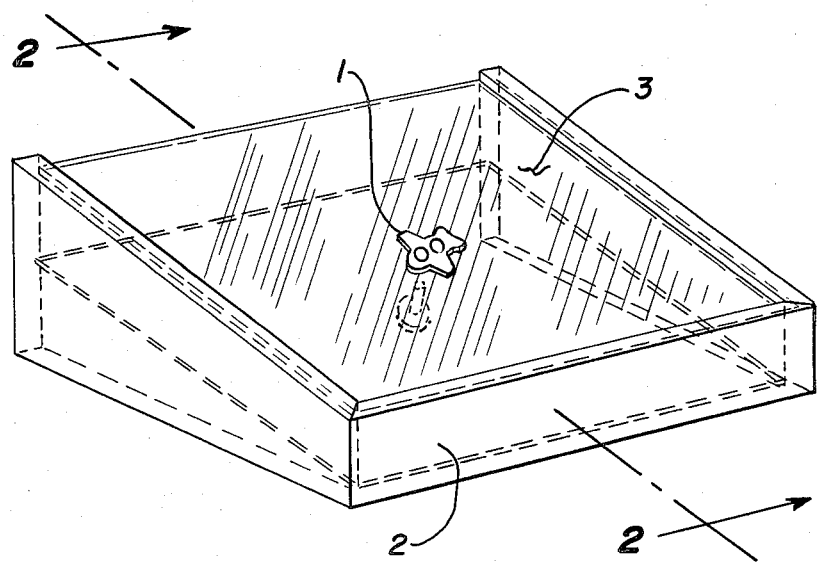
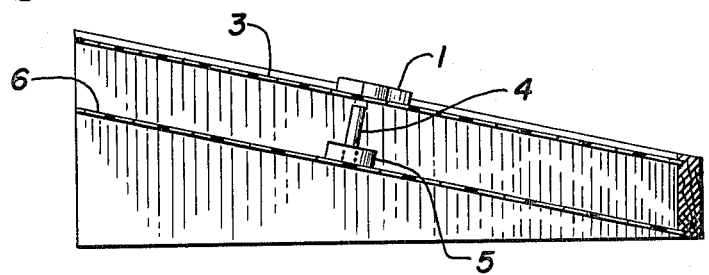
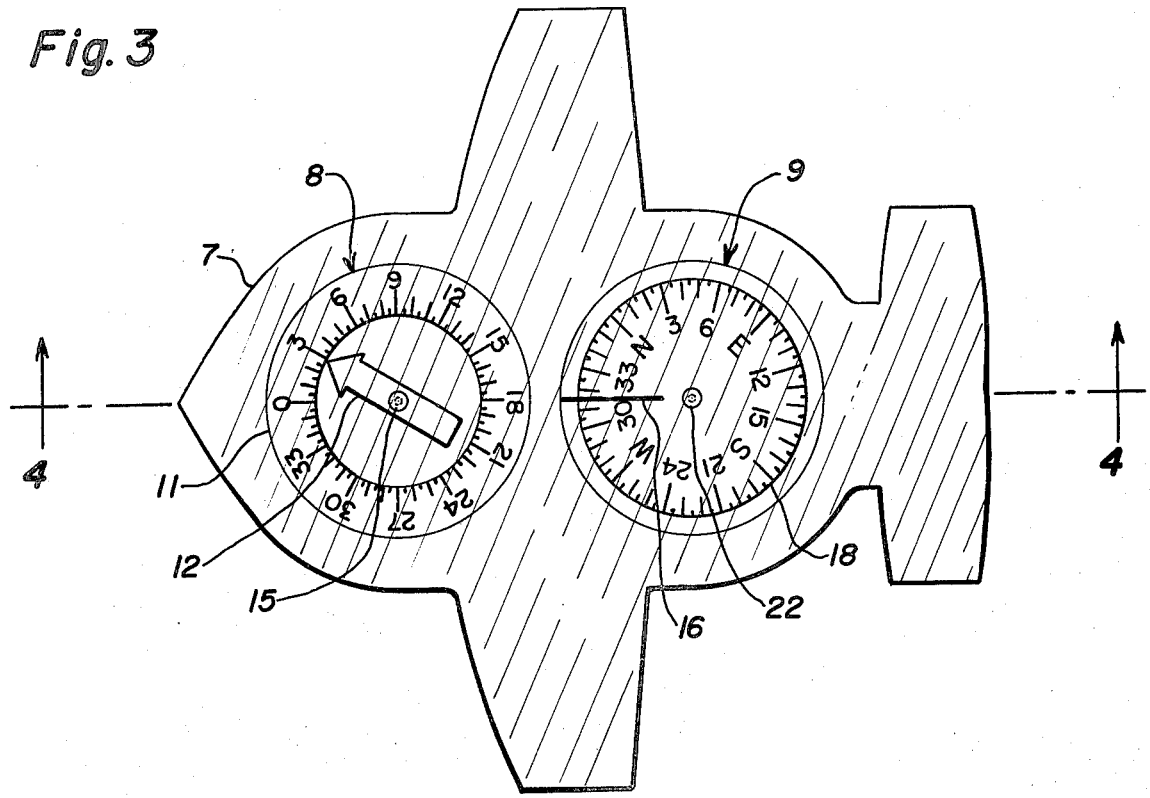

NDB INSTRUMENT FLIGHT TRAINER

BACKGROUND OF THE INVENTION

This invention is an instructional aid for pilots learning the techniques of instrument flying. Specifically, this device is useful in learning the techniques for navigating by reference to nondirectional beacon (NDB) radio transmitters and making NDB instrument landing approaches (blind landings).

In aviation, atmospheric conditions are classified as "visual" or "instrument." Visual conditions prevail when the ground is visible and the pilot can see for a considerable distance in front of the aircraft. Instrument conditions prevail when the visibility is poor enough to require navigation solely by cockpit instruments.

To fly under instrument conditions, a pilot must acquire an "instrument rating" in addition to his pilot's license. An instrument-rated pilot may (within certain limitations) fly through clouds and rain, navigating by reference to special radio transmitters on the ground. Upon reaching his airport of destination, the pilot must execute an instrument landing approach. This carefully planned procedure (published on government maps) will guide the pilot from an altitude of several thousand feet down to a few hundred feet above the ground, and will position him over the end of the runway headed in the proper direction for landing. The instrument landing approach is the most precise and critical part of an instrument flight.

There are three types of instrument landing approaches, classified according to the type of radio transmitters used: they are the VOR, ILS, and NDB approaches. This invention relates to training pilots in proper utilization of the NDB transmitter for both in-flight navigation and making instrument landing approaches.

The NDB is the oldest of the three types of approaches, it is the least precise and the most difficult for the pilot to execute. It is still in wide use, however, because it utilizes a very simple and inexpensive transmitter. Hundreds of small airports have only NDB approaches; many large airports have an NDB approach as back-up, to be used if the VOR or ILS transmitter fails. The Federal Aviation Administration requires each pilot applying for an instrument rating to demonstrate competence in NDB approaches.

The NDB approach system consists of a ground radio transmitter (located on or near the airport), a special radio receiver in the aircraft, and a detailed map of the approach procedure.

The ground transmitter is the nondirectional beacon which gives the approach its name. It is a simple low frequency (200 to 415 kilohertz) transmitter which broadcasts a signal which is uniform in all directions (hence nondirectional). The carrier is modulated with an audible tone; the tone is interrupted to create a Morse code identification. Each NDB has a different three-letter identification so that the pilot may be sure he has tuned in the proper transmitter.

The airborne receiver is an automatic direction finder which tells the pilot which direction the radio signal is coming from. This information is displayed in the cockpit on a relative bearing indicator. The relative bearing indicator is a circular instrument calibrated with an azimuth of 360 degrees. In the center of the circle is a rotating needle with an arrow on one end. The needle indicates the direction (bearing) of the NDB transmitter relative to the airplane. If the needle comes to rest at 0°, the transmitter is directly in front of the airplane. If the needle points to 90°, the transmitter is off the right wingtip; at 180° it is behind the airplane; at 270° it is off the left wingtip. Whenever the airplane is within range of the NDB transmitter, the pilot may readily observe the direction of the transmitter relative to the airplane.

The relative bearing indicator tells the pilot the direction of the NDB in relation to the airplane, but it does not tell him the direction of the airplane in relation to the NDB. If, for example, the needle of the relative bearing indicator points to 0°, the pilot knows that the NDB is directly ahead. But he does not know whether he is north, south, east, or west of the NDB. To learn his direction from the NDB, the pilot must consult the compass. (The pilot would typically use the directional gyroscope or "gyro compass" instead of the harder-to-read magnetic compass.) If the compass shows that he is heading 90° or due east, while the relative bearing indicator shows 0°, then the pilot concludes that he is due west of the NDB.

Throughout an NDB landing approach the pilot must read the relative bearing indicator and the gyro compass, perform some mental arithmetic to determine his direction from the NDB, estimate the winds, add a correction for wind drift, then repeat the process.

NDB navigation is a complex process which requires a clear understanding of geometric relationships, the ability to visualize and anticipate changing angles, and the rapid mental manipulation of figures. It is very difficult to learn NDB navigation while flying an airplane, and training is best conducted on the ground until the student has mastered the necessary mental skills. The invention disclosed here is a simple, inexpensive device which can greatly facilitiate the learning of these skills.

BRIEF SUMMARY OF THE INVENTION

One of the objects of this invention is to provide a device to facilitate the learning of NDB navigation and NDB instrument landing approaches.

It is a further object of this invention to provide a simple training device which does not require electronic circuitry or electric current to activate it.

It is another object of this invention to provide apparatus for teaching NDB navigation and NDB instrument landing approaches which is simple of construction, inexpensive of manufacture, and extremely effective in use.

It is a further object to provide a model airplane with facsimile instruments including (but not limited to) a gyro compass and a relative bearing indicator.

It is still a further object that said model airplane have no mechanical attachment to any other part of the invention and be freely movable over a flat map-like surface.

It is a further object of this invention that said facsimile instruments in the model airplane automatically turn as the model is moved over the surface and, further, that the instruments move in a realistic fashion, duplicating the motions of actual instruments in an actual aircraft in flight.

An additional object is to provide a novel means for causing the facsimile gyro compass to move.

The foregoing objects and others are accomplished in accordance with this invention by providing a model aircraft in which the facsimile gyro compass is activated by affixing a weight to the south side of the compass card and placing the model on an inclined flat surface.

The model aircraft is also provided with a facsimile relative bearing indicator whose needle is a magnetized pointer which is attracted to a permanent bar magnet under the inclined flat surface, said bar magnet simulating the NDB transmitter.

Still other and further objects, features, and advantages will be apparent in the following detailed disclosure of the invention taken in conjunction with the accompanying drawings.

BRIEF DESCRIPTION OF THE DRAWINGS

For a better understanding of the invention, the following drawings form a part of the disclosure, wherein like character references designate like parts throughout several views wherein:

FIG. 1 is a perspective view of a slanted table upon which the model is manipulated, showing the model in one possible position on the table.

FIG. 2 is a cross-sectional side view of the table of FIG. 1 taken along line 2—2.

FIG. 3 is a plan view of the model airplane.

DESCRIPTION OF THE PREFERRED EMBODIMENT

Figure 4:
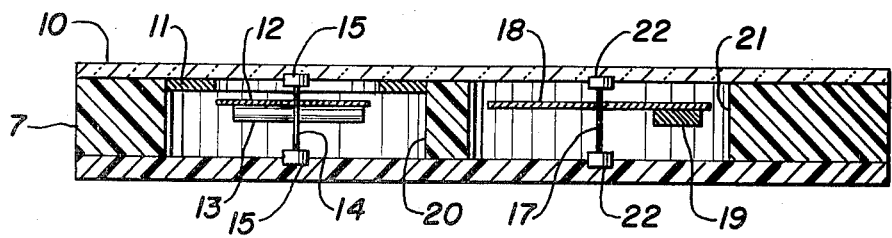
FIG. 4 is a cross-sectional side view of the model airplane taken along line 4—4 of FIG. 3.

Referring to FIGS. 1 and 2, the model airplane 1 must be used in conjunction with a specially designed table 2. As will be discussed further below, table 2 preferably includes an upper plate 3 and a lower plate 6, each of which has a top surface and a bottom surface. For instructional purposes, the top surface of the upper plate 3 is analogous to the surface of the earth. In use, the model airplane is placed on the table and moved along the top surface to simulate an actual airplane flying over the ground. The model airplane is not mechanically attached to the table; it may be moved to any position on the table and turned in any direction. As the model airplane is moved, the facsimile instruments will turn and give realistic readings. The top surface of the upper plate 3 has no markings on it, simulating instrument flying conditions wherein the pilot cannot see the ground. For initial training, however, it may be desirable to place a map over the upper plate so the student may readily determine the position of the airplane.

With reference to FIG. 2, one end of the table is elevated so that the upper plate 3 is inclined at an angle of approximately 15 degrees, though other angles up to and including 90 degrees may be used. With the exception of a magnet 4, the table is preferably constructed of non-magnetic material. To facilitate construction of a simple apparatus, magnet 4 should preferably be a single permanent bar magnet, though it may be comprised of more than one permanent bar magnet if all are properly aligned. The permanent bar magnet 4 is positioned under the upper plate 3 in such a manner that it is always perpendicular to the upper plate. The permanent magnet simulates the NDB transmitter; its magnetic field will activate the facsimile relative bearing indicator in the model airplane. The upper plate is opaque and the permanent magnet is concealed from view. The top end of the permanent magnet is positioned some distance below the bottom surface of the upper plate. This gap, which may be different for magnets of different strength, creates a magnetic field more favorable than one produced by a magnet in direct contact with the upper plate.

In the preferred embodiment, the permanent magnet 4 is mounted in a flat-bottomed holder 5, which rests upon but is not attached to the lower plate 6 which is beneath and parallel to the top plate 3 of the table. This permits the permanent magnet 4 and the magnet holder 5 to be easily moved to any position beneath the upper plate. The magnet and magnet holder are repositioned manually through a rear opening in cabinet 2 between plates 3 and 6. In this manner the location of the simulated NDB transmitter may be changed to vary the training problems.

In an alternate embodiment the magnet and holder are permanently fixed under the center of the upper plate of the table. The training problems would have less variety if the magnet were immobile, but the construction of the table would be simplified by the elimination of the lower plate 6.

In FIG. 3 the model airplane is shown in plan view, as it would appear to the student viewing it from above. The model airplane includes a non-ferrous housing 7 in the shape of an airplane as viewed from above. The model airplane contains two facsimile instruments: the relative bearing indicator 8 toward the front of the housing and the gyro compass 9 toward the rear.

FIG. 4 is a cross-sectional side view of the model taken along line 4—4 of FIG. 3. As shown in FIG. 4, both facsimile instruments are covered by and viewed through a transparent cover 10. With reference to FIGS. 3 and 4, the relative bearing indicator 8 includes a circular display of 360 degrees of azimuth 11. Said azimuth is permanently fixed to the lower surface of the transparent cover 10 and is oriented so that 0° is aligned with the nose of the model airplane, 180° is aligned with the tail, 90° is on the right side of the model, and 270° is on the left side, as shown in FIG. 3. The relative bearing indicator 8 also includes a single movable part, the indicator needle assembly which is shown in perspective in FIG. 5.

Figure 5:
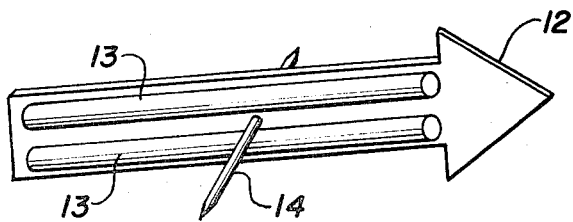
FIG. 5 is a bottom perspective view of the moving part of the facsimile relative bearing indicator.

With reference to FIGS. 4 and 5, the indicator needle assembly consists of an indicator needle 12, a pair of permanent bar magnets 13, and an indicator shaft 14. Both ends of the indicator shaft are shaped to form pointed pivots. In use, both ends of the indicator shaft rest in jeweled cup bearings 15 so that the indicator shaft is held securely in position but is free to rotate with little friction. The relative bearing indicator needle 12 is made of a flat piece of non-magnetic material, formed in the outline of an arrow. The indicator needle lies in a plane perpendicular to the indicator shaft 14 and is rigidly affixed to said shaft. As the indicator shaft rotates, the indicator needle may align with and point to any degree on the azimuth 11.

Attached to the lower surface of the indicator needle 12 is a pair of slender permanent bar magnets 13, as shown in FIG. 5. The axes of the bar magnets are parallel to the axis of the indicator needle and the bar magnets are on opposite sides of the indicator shaft 14. The bar magnets have like poles adjacent to each other so that both North poles are at one end of the needle and both South poles are at the other end. The bar magnets are concealed from view when the facsimile relative bearing indicator is in use.

The bar magnets 13 are the only magnetized parts in the model airplane. Further, all other parts of the model airplane are constructed of non-magnetic materials.

The entire indicator needle assembly comprises one moving part which is mass balanced about the indicator shaft 14 such that the assembly will not be rotated by gravity when the model airplane is tilted. The motion of the indicator needle assembly is directed solely by the magnetic field of the magnet 4 in the table.

In use, the model airplane is placed on the table 2 as shown in FIG. 1. As the model airplane is moved on the inclined surface of the table, the indicator needle of the relative bearing indicator will always point towards the permanent magnet 4, thereby simulating and duplicating the actions of an actual aircraft relative bearing indicator as the aircraft maneuvers in the vicinity of an NDB transmitter.

Figure 6:
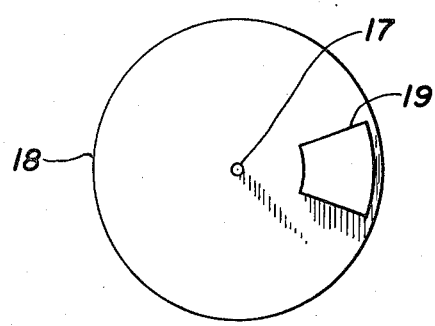
FIG. 6 is a bottom plan view of the moving part of the facsimile gyro compass.

The second instrument is the facsimile gyro compass 9 which is positioned towards the rear of the model airplane. The gyro compass includes a reference or lubber line 16 permanently affixed to the lower surface of the transparent cover 10. The lubber line lies on the front-rear axis of the model airplane and covers only the front edge of the gyro compass instrument, as may be seen in FIG. 3. The lubber line is the reference mark against which the gyro compass reading is taken. The gyro compass includes one moving part, the compass card assembly, which is shown in FIG. 6. The compass card assembly is comprised of three parts: the compass shaft 17, the compass card 18, and the compass card weight 19, which are rigidly and permanently attached to each other so that they move as a single part. Both ends of the compass shaft 17 are shaped to form pointed pivots. In use, both ends of the compass shaft rest in jeweled cup bearings 22 so that the compass shaft is held securely in position but is free to rotate with little friction. The compass card 18 is a circular disc made of flat non-magnetic material. The top surface of the compass card is printed with a circular display of 360 degrees of the style commonly used on aircraft directional gyro instruments, as can be seen in FIG. 3. The compass card is rigidly and permanently affixed to the compass shaft 17 so that the compass shaft is perpendicular to the compass card. A small compass weight 19, made of lead or other dense non-magnetic material, is rigidly and permanently attached to the bottom surface of the compass card. The compass weight is attached near the edge of the compass card and is centered on the south or 180° position of the compass card. The compass weight is concealed from view when the facsimile gyro compass is in use. When the model airplane is placed on the inclined top surface of the upper plate, the compass card assembly will be tilted. The weight 19 will cause the compass card to rotate so that the 0° or north position points toward the top of the inclined surface. The compass card will retain this orientation with respect to the inclined surface when the model airplane is moved around the surface and turned in different directions, thereby simulating and duplicating the action of an actual gyro compass.

The cavities 20 and 21, shown in FIG. 4, may be filled with a clear liquid to dampen the movement of the facsimile instruments.

It will be understood that various other changes of the details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention.

What is claimed is:

1. Apparatus for visually demonstrating NDB instrument navigational techniques, comprising:

a planar table having a first playing surface inclined with respect to the horizontal, and an opposing second surface;

first magnetic means selectively positionable adjacent to said second surface of said table, opposite said first surface;

a manually movable model airplane having a nose and an opposing tail and engageable with said first surface of said table, said model airplane including a facsimile automatic direction finder relative bearing indicator responsive to said first magnetic means, said facsimile relative bearing indicator including an annular azimuth scale with degree markings equally spaced around the periphery thereof from zero degrees to 360 degrees, the zero marking adjacent said nose of said model airplane, a pointer positioned within the central opening of said azimuth scale, said pointer rotatable about an axis vertical to said model airplane, said pointer further includes a second magnetic means fixed thereto so that said pointer is rotated and directed toward first magnetic means, and a facsimile gyro compass containing a compass card with direction markings thereon including north, south, east and west at the proper 90 degree relationships, said compass card mounted to an axis vertical to said model airplane and freely rotatable through 360 degrees.

2. The apparatus of claim 1 wherein said gyro compass card further includes a weight affixed to said gyro compass card adjcent the south direction marking whereby said south direction marking is directed downward relative to said table.

3. The apparatus of claim 2 wherein said model airplane further includes a reference line thereon adjacent said gyro compass card, directed along a line from said nose to said tail of said model airplane.

4. The apparatus of claim 3 further including a third surface parallel to said second surface and spaced away therefrom in a direction opposite said first surface; and said first magnetic means engagable with said third surface and selectively manually movable thereon.

* * * * *